Dec. 15, 1953  F. O. WORDEN  2,662,363
LARGE HAYRAKE
Filed June 11, 1951  3 Sheets-Sheet 1
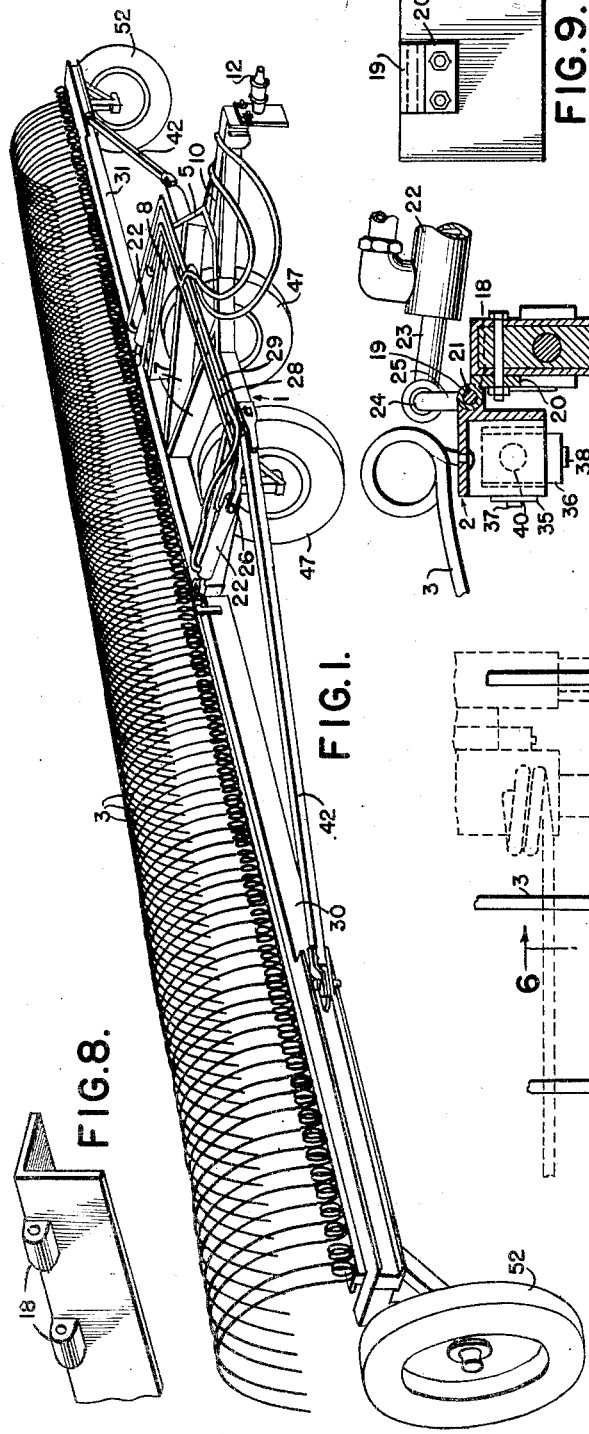
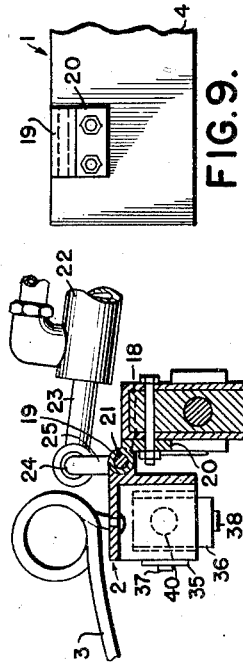
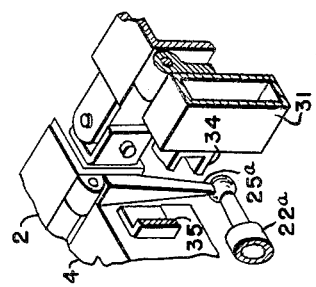
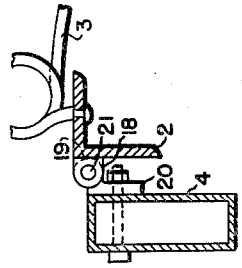
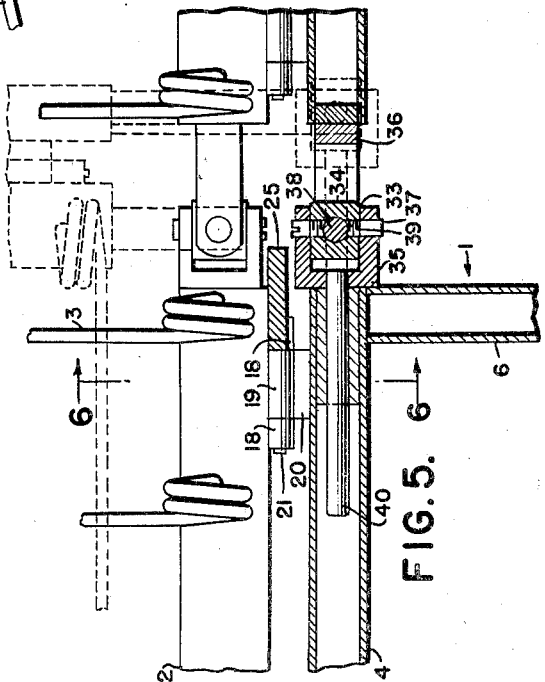
INVENTOR.
Floyd O. Worden
BY Shoemaker & Mattare
ATTORNEYS Dec. 15, 1953     F. O. WORDEN     2,662,363
LARGE HAYRAKE Filed June 11, 1951                                                3 Sheets—Sheet 2

*INVENTOR.*
Floyd O. Worden
BY *Shoemaker & Mattare*
ATTORNEYS

Dec. 15, 1953　　　　　　　　F. O. WORDEN　　　　　　　2,662,363
　　　　　　　　　　　　　　　LARGE HAYRAKE
Filed June 11, 1951　　　　　　　　　　　　　　　　3 Sheets-Sheet 3
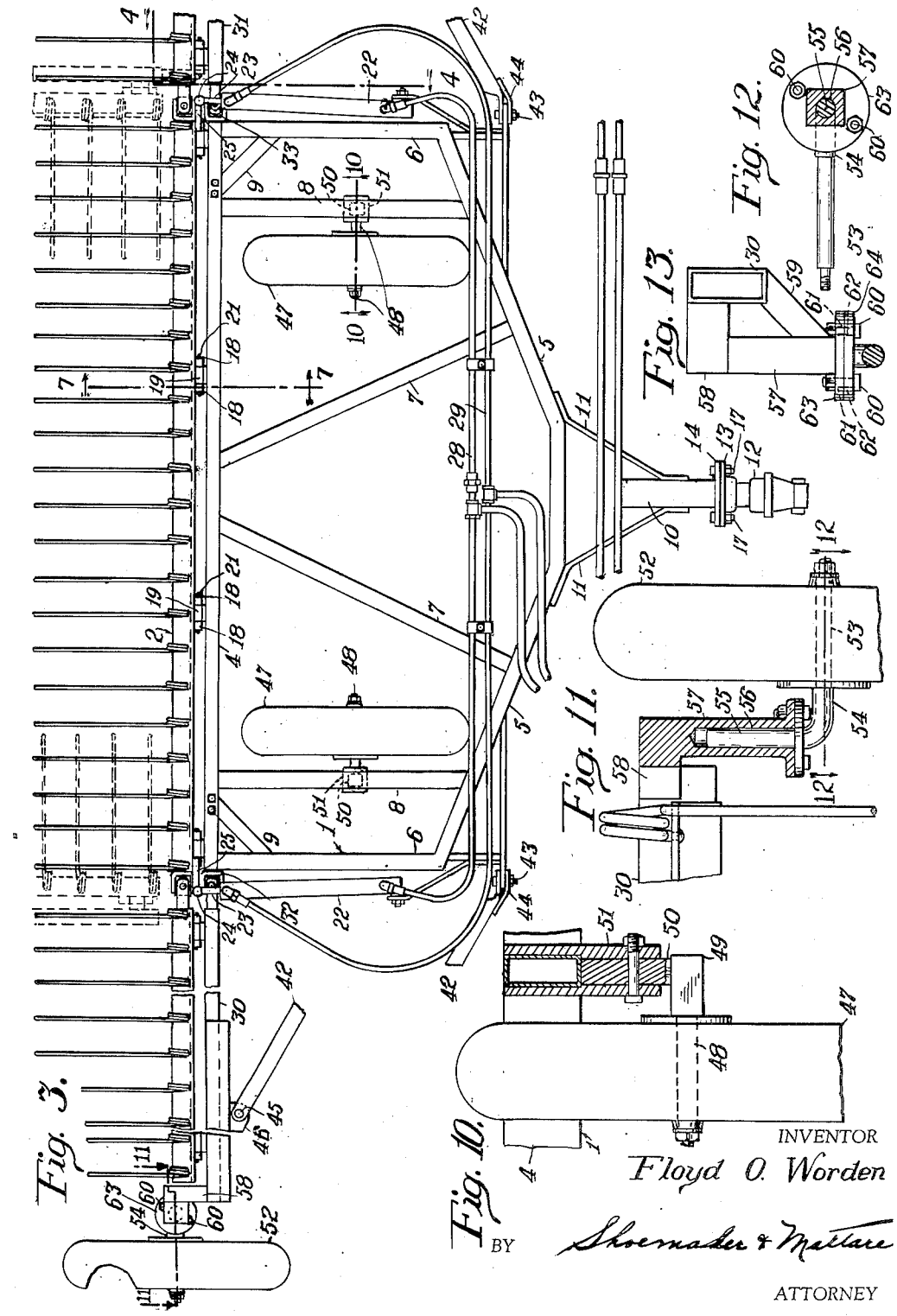
INVENTOR
Floyd O. Worden
BY Shoemaker & Mattare
ATTORNEY Patented Dec. 15, 1953

2,662,363

UNITED STATES PATENT OFFICE 2,662,363

LARGE HAYRAKE

Floyd O. Worden, Alliance, Nebr., assignor to Willia Edna Worden, Alliance, Nebr.

Application June 11, 1951, Serial No. 230,965

10 Claims. (Cl. 56—384)

The invention relates to a large hay rake.

The primary object of the present invention is to provide a large hay rake especially designed for large hay fields where variations of surface of land and quantities of hay are quite pronounced, and capable of automatically following or adjusting itself to the contour of the ground and adapted also to be reduced in size to enable it to pass through farm gates and other narrow places and also for traveling along roads, and the like.

A further object of the invention is to provide a hay rake of this character, of strong, durable and comparatively inexpensive construction, adapted to be readily made and handled conveniently, in sizes ranging from 16 to 42 feet of rake tooth beam length and various other dimensions thereof, and equipped with hydraulic rams adapted to be operated from the pump of a tractor or analogous means, and capable of raising and lowering the rake tooth beam and the teeth or tines and of also maintaining them under pressure in contact with the ground.

It is also an object of the invention to locate the hydraulic rams so that their push and pull may be balanced and to dispose the inner main carrying wheels of the supporting frame a sufficient distance in advance of the rake tooth beam for counter-balancing the weight of the rake tooth beam and the teeth thereof, and with the axis of the outer carrying wheels in substantial alignment with the rake tooth beam.

It is also an object of the invention to provide a large hay rake composed of a main central section and end sections hingedly connected to the central section and adapted to be swung inwardly and outwardly with relation to the same to enable the end sections to form continuations of the central section for raking hay and also for reducing the width of the hay rake.

Another object of the invention is to equip the hinged end sections with end wheels adapted when the end sections are mounted for inward and rearward swinging to be adjusted to an angle of 90° to position them in substantial alignment or parallelism with the main wheels for traveling over the ground and for supporting the end sections in their folded position.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a perspective view of a large hay rake constructed in accordance with this invention and shown arranged for operation;

Fig. 3 is a plan view broken away at parts and showing in full lines the rake arranged for operation and illustrating in dotted lines the end sections in their folded position;

Fig. 5 is a fragmentary top plan view with parts shown in horizontal section illustrating the arrangement of the associated universal joints for hinging the sections of the rake tooth beam together and for hingedly connecting the sections of the main frame;

Fig. 6 is a detail vertical sectional view taken on the line 6—6 of Fig. 5;

Fig. 7 is a detail vertical sectional view on the line 7—7 of Fig. 3 illustrating one arrangement of hinge connection between the rake tooth beam and the main frame;

Fig. 8 is a detail perspective view of a portion of the rake tooth beam illustrating the arrangement of the eyes of the hinge connection;

Fig. 9 is a detail view of a portion of the main frame and the hinge leaf or bracket which cooperates with the eyes of rake tooth beam to form a hinge;

Fig. 10 is a detail vertical sectional view on the line 10—10 of Fig. 3 illustrating the manner of mounting the stub axle of the main supporting wheel;

Fig. 11 is a detail vertical sectional view on the line 11—11 of Fig. 3 illustrating the manner of adjustably mounting the stub axle of the end wheel;

Fig. 12 is a horizontal sectional view taken on the line 12—12 of Fig. 11;

Fig. 13 is a detail elevation partly in section of the supporting means for the end wheel;

Fig. 15 is a detail perspective view showing a slightly modified arrangement of the lifting arm on the rake tooth supporting beam and the hydraulic ram.

Figure 2:
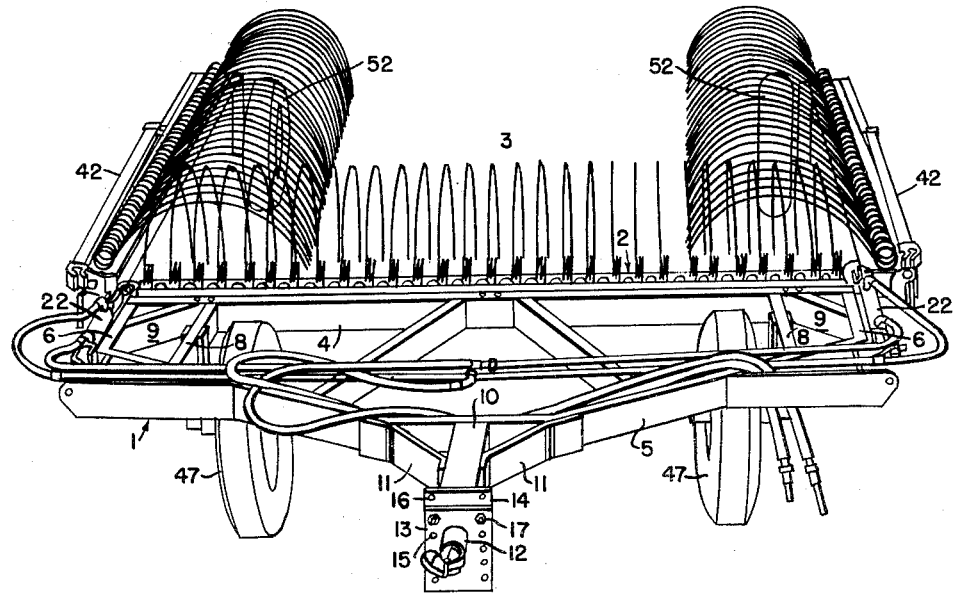
Fig. 2 is a similar view, the end sections being folded rearwardly for compactness.
Figure 4:
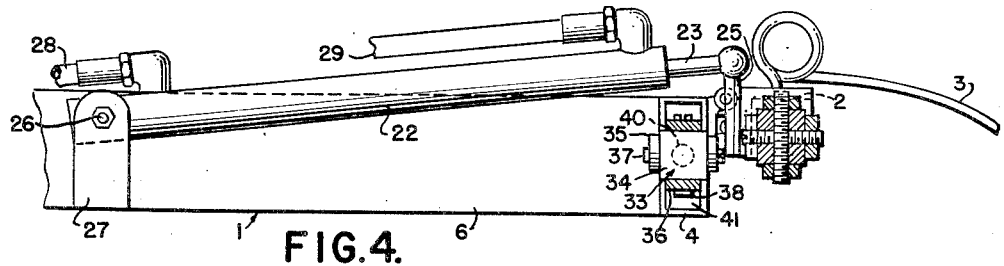
Fig. 4 is a vertical sectional view on an enlarged scale taken substantially on the line 4—4 of Fig. 3 illustrating the arrangement of the hydraulic ram and showing the connection between the same and the rake tooth beam.
Figure 14:
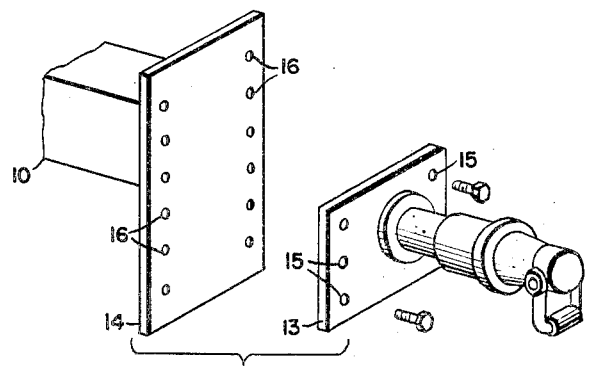
Fig. 14 is a detail exploded view of a coupling for adjustably hitching the rake to a tractor.

In the accompanying drawings, in which is illustrated the preferred embodiment of the invention, the large hay rake comprises in its construction a main supporting frame 1 and a rake tooth beam 2 provided with standard or any other desired type of rake teeth or tines 3 and hinged to the supporting frame for upward and downward movement for raising and lowering the rake teeth.

The main supporting frame comprises in its construction a rear frame bar 4, a front frame bar 5 and end bars 6 welded or otherwise secured to the rear and front bars 4 and 5 to form a rigid frame structure which is braced by central forwardly diverging bracing members 7, intermediate braces 8 and corner braces 9, all preferably constructed of rectangular tubing, bolted, welded or otherwise secured together. The front bar 5 has a central portion forwardly offset from the end portions thereof and carrying a short tongue 10 rigidly secured at its rear end to the front bar 5 and supported at opposite sides by forwardly converging braces 11 welded or otherwise secured at their rear ends to the front face of the front bar and similarly secured to the short tongue intermediately of the ends thereof.

The short tongue is adapted to be hitched to a tractor by means of a vertically adjustable coupling 12 which may be of any desired construction and which is carried by a vertically adjustable plate 13 secured by bolts or other suitable fastening devices to a fixed vertical plate 14 rigidly secured to the front end of the short tongue. The plates 13 and 14 are rectangular and are provided at their opposite vertical edges with spaced perforations 15 and 16 for the reception of bolts 17 extending through registering perforations of the plates 13 and 14 and securing the coupling 12 in its vertical adjustment.

The rake tooth beam preferably consists of an angle bar, L-shaped in cross section, as clearly illustrated in Figs. 7 and 8 of the drawings, and it is provided at intervals exteriorly of its angle with spaced eyes 18 which are adapted to receive between them eyes 19 of brackets or leaf plates 20 bolted or otherwise secured to the rear face of the rear frame bar 4. The eyes 18 and 19 register and receive pintles 21 whereby the rake tooth beam is hingedly mounted on the supporting frame for vertical swinging movement to raise and lower the rake teeth which may be mounted on the rake tooth beam in any suitable manner.

The rake teeth are raised and lowered by means of hydraulic rams 22 which may be located exteriorly of the end bars 6 of the supporting frame and have their pistons 23 connected by a ball and socket joint 24 with lifting arms 25 extending upwardly from the rake tooth beam, but the hydraulic rams and the arms 25 of the rake tooth beam may be arranged in any other desired manner with relation to the supporting frame, as will be readily understood. For instance, the hydraulic rams may be carried by the end sections of the supporting frame and the lifting arms 25ª may extend downwardly from the rake tooth beam for connection with the hydraulic ram 22ª as illustrated in Fig. 15 of the drawings. When the hydraulic rams are carried by the outer sections of the supporting frame any suitable means such as brackets may be provided for pivotally mounting the cylinders of the hydraulic rams. The front ends of the hydraulic rams may be pivotally connected at 26 to lugs 27 extending from the end bars 6 and any suitable adjusting means may be provided for rigidly securing the hydraulic rams in lateral adjustment on their pivots 26. Instead of employing a ball and socket joint, any other form of pivotal connection may be provided for effecting a pivotal or hinge connection between the pistons of the hydraulic rams and the rake tooth beam. The rams are connected at their ends by pipe lines 28 and 29 with a tractor or other pump, not shown, as will be readily understood, and the hydraulic rams, which are adapted to raise and lower the rake teeth, are also employed for maintaining the rake teeth in pressure engagement with the ground.

The rear bar 4 of the main supporting frame and the rake tooth beam are provided with end extensions or sections 30 and 31 which may be of any desired length to provide a large hay rake having a rake tooth beam of from 16 to 42 feet in length, or other dimensions, and the end sections 30 of the rear bar 4 and the end sections 31 of the rake tooth beam 2 are hingedly connected, preferably by universal joints 32 and 33, each consisting of a central bearing block 34 of general circular formation, and approximately U-shaped members 35 and 36 set at right angles to each other and connected to the bearing block by pins 37 and 38 having their axes arranged in the same transverse plane. In constructing the universal joint, the block 34 is first drilled to provide one pin opening which is threaded at 39 to receive one of the pins which is threaded and secured in the threaded opening. The block, with the threaded pin therein, is then bored at right angles to the threaded opening and the other pin is passed therethrough and may be secured therein and in openings of the associated member by any suitable means, such as peening or the like. The pins 37 and 38 have terminal journal portions which are arranged in openings of the members of the universal joint and pivotally connect the members 35 and 36 to the block 34.

The end sections of the rake tooth beam and the rear bar 4 of the supporting frame with the rake teeth constitute end sections of the rake which are adapted to be arranged in alignment with the central section thereof and which are also adapted to be swung rearwardly from the position illustrated in Fig. 1 of the drawings to that shown in Fig. 2 for reducing the width of the rake to enable it to travel over roads, pass through farm gates and other narrow spaces. In the hinge or pivotal movements of the end sections toward and from the main or central section of the supporting frame, the hinge connections between the end sections of the rake tooth beam and the central section thereof form the axis of such pivotal movement and in order to enable the end sections of the rear frame bar 4 to pivot in conformity with the end sections of the rake tooth beam, one of the members of each of the universal joints of the supporting frame is provided with an extension 40 which may be round, square or any polygonal shape in cross section and which constitutes a slide and is slidably mounted in a guide 41 mounted in each end of the central section of the rear bar 4. In the swinging movement of the end portions of the rake the slides 40 move inwardly and outwardly in the guides 41 and thereby enable the end sections of the rear bar to swing or pivot with the end sections of the rake tooth beam.

The end sections of the rake are maintained in alignment with the central section of the rake by means of forwardly converging brace rods 42 detachably secured at their front ends by bolts 43 to perforated lugs or eyes 44 extending from the terminal portions of the front frame bar 5, as clearly illustrated in Figs. 1 and 3 of the drawings. The outer or rear ends of the brace rods 42 are secured by bolts 45 to lugs 46 projecting from the extensions 30 at the outer portions thereof. The bolts 45 form pivots which permit the brace rods to fold against the extensions 30 of the rear frame bar 4 when the front ends of the brace rods 42 are detached from the projecting lugs or ears 44 of the front frame bar 5.

The rake is supported by rubber tired main wheels 47 preferably of the pneumatic type, which are mounted on spindles 48 of stub axles 49 provided with upwardly extending arms 50 fitting within and suitably secured to vertical socket pieces 51 of rectangular tubular metal, welded or otherwise secured to the intermediate braces 8. The main supporting wheels are forwardly offset or spaced from the axis of the rake tooth beam and cooperate with the supporting frame in counterbalancing the same and the rake teeth.

The hinged side portions of the rake are supported by end wheels 52 which are rubber tired and are of the pneumatic type and are of the same diameter as the central main wheels 47. The end wheels are mounted on journals 53 of stub axles 54 provided with upwardly extending arms 55 journaled for rotary adjustment in vertical cylindrical sockets 56 formed of metal tubing and arranged within vertical posts 57 of end supports each consisting of the said posts 57 and an upper horizontal connecting member 58 and a lower inclined bracing member 59, which are welded or otherwise secured to each of the end sections 30 of the rear frame bar 4. The pivotal mountings of the stub axles 54 permit the wheels 52 to be positioned in parallelism with the main wheels 47 when the rake is arranged for operation as illustrated in Fig. 1 of the drawings, and also to be turned at right angles to arrange them in parallelism with the main wheels when the side sections of the rake are folded inwardly and rearwardly into the folded or contracted position illustrated in Fig. 2 of the drawings. The stub axles are secured in either of said positions by means of bolts 60 which are arranged in bolt openings 61 and 62 of arcuate plates 63 and 64 rigidly affixed to the lower ends of the posts 57 and to the stub axles 54. The plates 63 and 64 fit flat against each other and the removable bolts 60 permit the end wheels to be arranged in either of said positions. Instead of providing means for fixedly securing the stub axles in fixed relation to the vertical posts 57, caster wheels may be provided for enabling the end wheels to adjust themselves automatically to the position of the end sections of the rake which in practice are preferably arranged to permit more than a 90° pivotal adjustment. Also, instead of positioning the stub axles 54 of the outer wheels 52 in substantial alignment with the rake tooth beam, they may be rearwardly offset with relation to the same.

Any suitable cleaner rods or other means may be employed for removing hay accumulated between the teeth of the rake.

I claim:

1. A hay rake comprising a rake tooth supporting beam having a central section and end sections pivoted thereto about substantially vertical pivots, a mobile supporting frame comprising a central section and end sections, said frame sections being substantially coextensive, respectively, with said beam sections and respectively hingedly connected thereto about horizontal pivots, said frame sections having pivoted and extensible interconnecting means, and brace means interconnecting said end frame sections and said central frame section, whereby when said brace means are released said end sections may be pivoted to reduce the overall width of the rake.

2. A hay rake comprising a rake tooth supporting beam having a central section and end sections pivoted thereto about substantially vertical pivots, a mobile supporting frame comprising a central section and end sections, said frame sections being substantially coextensive, respectively, with said beam sections and respectively hingedly connected thereto about horizontal pivots, said frame sections having pivoted and extensible interconnecting means, and brace means interconnecting said end frame sections and said central frame section, whereby when said brace means are released said end sections may be pivoted to reduce the overall width of the rake, and means mounted on the central section of the supporting frame operatively connected with the rake tooth supporting beam for rocking the same about said horizontal pivots to raise or lower the rake teeth thereof.

3. A hay rake comprising a rake tooth supporting beam having a central section and end sections pivoted thereto about substantially vertical pivots, a mobile supporting frame comprising a central section and end sections, said frame sections being substantially coextensive, respectively, with said beam sections and respectively hingedly connected thereto about horizontal pivots, said frame sections having pivoted and extensible interconnecting means, and brace means interconnecting said end frame sections and said central frame section, whereby when said brace means are released said end sections may be pivoted to reduce the overall width of the rake, and means mounted on the central section of the supporting frame operatively connected with the rake tooth supporting beam for rocking the same about said horizontal pivots to raise or lower the rake teeth thereof, said last mentioned means comprising arms on the rake tooth supporting beam located near opposite sides of the central section of the supporting frame and a hydraulic ram mounted on the central section of the supporting frame at each side thereof extending alongside the same and pivotally connected with the adjacent arm on the rake tooth supporting beam.

4. A hay rake of the construction defined in claim 1 and in which the pivotal connections of the end sections of the rake tooth supporting beam to the central section thereof each consists of a universal joint comprising a block, pins mounted on the block and arranged at right angles to each other, and a pair of approximately U-shaped members having bearing openings in free end portions thereof receiving said pins whereby the U-shaped members are connected to said block for pivotal movement.

5. A hay rake of the construction defined in claim 1 and in which the pivoted and extensible interconnecting means between the supporting frame sections includes a universal joint.

6. A hay rake of the construction defined in claim 1 and in which the pivoted and extensible interconnecting means between the supporting frame sections comprises a universal joint having its inner end slidably mounted for limited movement longitudinally of the central section of the supporting frame.

7. A hay rake of the construction defined in claim 1 and wherein the central section of the supporting frame has at each end thereof a longitudinally extending tubular bearing, and wherein the pivoted and extensible interconnecting means between the supporting frame sections comprises a universal joint having at one end thereof a rod extension slidably engaging one of the tubular bearings at one end of the central section of the supporting frame.

8. A hay rake comprising a rake tooth supporting beam having a central section and end sections pivoted thereto about substantially vertical pivots, a mobile supporting frame comprising a central section and end sections, said frame sections being substantially coextensive, respectively, with said beam sections and respectively hingedly connected thereto about horizontal pivots, said frame sections having pivoted and extensible interconnecting means, and brace means interconnecting said end frame sections and said central frame section, whereby when said brace means are removed said end sections may be pivoted to reduce the overall width of the rake, a pair of main wheels mounted on and supporting the central section of the supporting frame, end wheels on the end sections of the supporting frame at the outer ends thereof, and mounting means for the end wheels providing for positioning the latter in parallelism with said main wheels when the end sections of the rake tooth supporting beam are in operative position in alignment with the central section thereof or are moved out of operative position to reduce the width of the rake.

9. A hay rake of the construction defined in claim 8 and wherein the mounting means for the end wheels includes stub axles provided with spindles and having vertical arms journaled in the end sections of the supporting frame, and fastening means for rigidly securing the stub axles in a position extending longitudinally of the end sections of the supporting frame when the latter are in operative position in alignment with the central section of the same and also for securing the stub axles in a position extending at right angles to the end sections of the supporting frame when the latter are positioned to reduce the width of the rake.

10. A hay rake of the construction defined in claim 1 and which has means connected with the central section of the supporting frame operatively connected with the rake tooth supporting beam for rocking the same about the horizontal pivots to raise or lower the rake teeth thereof, said last mentioned means comprising arms on the rake tooth supporting beam extending downwardly therefrom at opposite sides of the central section of the supporting frame, and a hydraulic ram at each side of the central section of the supporting frame pivotally connected at one end with the adjacent downwardly extending arm on the rake tooth supporting beam and pivotally connected at its other end with the central section of the supporting frame, said hydraulic rams each being disposed below the horizontal plane of the central section of the supporting frame.

FLOYD O. WORDEN.

References Cited in the file of this patent

UNITED STATES PATENTS

| Number | Name | Date |
|---|---|---|
| 71,875 | Hawkey | Dec. 10, 1867 |
| 260,056 | Shields | June 27, 1882 |
| 965,110 | Howe | July 19, 1910 |
| 1,272,567 | Swan | July 16, 1918 |
| 1,927,458 | Klise | Sept. 19, 1933 |
| 2,526,028 | Johnson | Oct. 17, 1950 |
| 2,533,417 | Barnes | Dec. 12, 1950 |

FOREIGN PATENTS

| Number | Country | Date |
|---|---|---|
| 47,374 | Denmark | May 29, 1933 |